United States Patent
Shigeta et al.

(10) Patent No.: US 12,021,568 B2
(45) Date of Patent: Jun. 25, 2024

(54) OPTICAL RECEIVER

(71) Applicant: Fujitsu Limited, Kawasaki (JP)

(72) Inventors: Yusuke Shigeta, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 17/973,963

(22) Filed: Oct. 26, 2022

(65) Prior Publication Data

US 2023/0224045 A1 Jul. 13, 2023

(30) Foreign Application Priority Data

Jan. 13, 2022 (JP) .................................. 2022-003679

(51) Int. Cl.
*H04B 10/61* (2013.01)
*H04B 10/079* (2013.01)
*H04J 14/02* (2006.01)

(52) U.S. Cl.
CPC ... *H04B 10/6164* (2013.01); *H04B 10/07955* (2013.01); *H04J 14/0224* (2013.01); *H04B 2210/003* (2013.01)

(58) Field of Classification Search
None
See application file for complete search history.

(56) References Cited

U.S. PATENT DOCUMENTS

| | | | |
|---|---|---|---|
| 2003/0043437 A1* | 3/2003 | Stough | H04B 10/0773 398/141 |
| 2013/0294783 A1* | 11/2013 | Yu | H04L 27/3818 398/208 |
| 2013/0330070 A1* | 12/2013 | Yu | H04B 10/541 398/16 |
| 2015/0023667 A1* | 1/2015 | Yu | H04L 27/2697 398/79 |
| 2016/0065313 A1* | 3/2016 | Yu | H04B 10/614 398/208 |
| 2017/0019203 A1 | 1/2017 | Asm et al. | |
| 2017/0041080 A1* | 2/2017 | Tanaka | H04B 10/61 |
| 2019/0018144 A1 | 1/2019 | Imaki et al. | |

FOREIGN PATENT DOCUMENTS

| | | |
|---|---|---|
| JP | 2017-28359 A | 2/2017 |
| JP | 2017-098751 A | 6/2017 |
| WO | WO 2017/130315 A1 | 8/2017 |

\* cited by examiner

*Primary Examiner* — David W Lambert
(74) *Attorney, Agent, or Firm* — STAAS & HALSEY LLP

(57) ABSTRACT

An optical receiver includes an optical filter that transmits signal light to be received from wavelength-multiplexed signal light, a light source that outputs local oscillation light, a 90-degree hybrid circuit that causes the local oscillation light output from the light source to interfere with the signal light transmitted through the optical filter to output interference signal light, a converter that converts the interference signal light into an electrical data signal, a spectrum detector that detects a frequency spectrum of the electrical data signal based on the electrical data signal, and a controller that controls a center frequency of a passband of the optical filter based on a shape of the frequency spectrum.

11 Claims, 12 Drawing Sheets

OPTICAL RECEIVER

CROSS-REFERENCE TO RELATED APPLICATION

This application is based upon and claims the benefit of priority of the prior Japanese Patent Application No. 2022-003679 filed on Jan. 13, 2022, the entire contents of which are incorporated herein by reference.

FIELD

A certain aspect of the embodiments is related to an optical receiver.

BACKGROUND

WDM (Wavelength Division Multiplexing) is known as one of techniques for realizing a large capacity or high speed communication system. The WDM transmits data using a plurality of different wavelengths. That is, in the WDM, data is transmitted using wavelength-multiplexed signal light in which a plurality of wavelength channels are multiplexed. When an interval between the wavelength channels is narrowed, interference (i.e., cross-talk) is likely to occur between the wavelength channels.

An optical receiver of an optical transmission system using the WDM is provided with a filter for extracting signal light of a desired wavelength channel from the wavelength-multiplexed signal light including the plurality of wavelength channels. In order to suppress the influence from adjacent wavelength channels, it is preferable that the band of the filter is appropriately controlled according to the interval between adjacent wavelength channels. If the band of the filter is too wide, suppression of crosstalk becomes insufficient. On the other hand, if the band of the filter is too narrow, some of the elements of the signal light to be extracted are removed, so that the quality of the received signal is degraded. The optical receiver also includes a receiver for generating an electric data signal from signal light including a target wavelength channel (see Japanese Laid-open Patent Publication No. 2017-028359).

The receiver includes a 90-degree hybrid, a photodiode (PD), and a transimpedance amplifier (TIA). Signal light and local oscillation light are incident on the 90-degree hybrid. The signal light incident on the 90-degree hybrid is multiplexed with the local oscillation light and then emitted as interference signal light. The PD receives the interference signal light emitted from the 90-degree hybrid and generates a photocurrent as a data signal by photoelectric conversion. The TIA converts the photocurrent output from the PD into a voltage and amplifies the voltage (see Japanese Laid-open Patent Publication No. 2017-098751). Note that the technique related to the present disclosure is disclosed in International Publication Pamphlet No. 2017/130315.

SUMMARY

In one aspect of embodiments, there is provided an optical receiver including: an optical filter that passes signal light to be received from wavelength-multiplexed signal light; a light source that outputs local oscillation light; a 90-degree hybrid circuit that causes the local oscillation light output from the light source to interfere with the signal light passed through the optical filter to output interference signal light; a converter that converts the interference signal light into an electrical data signal; a spectrum detector that detects a frequency spectrum of the electrical data signal based on the electrical data signal; and a controller that controls a center frequency of a passband of the optical filter based on a shape of the frequency spectrum.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
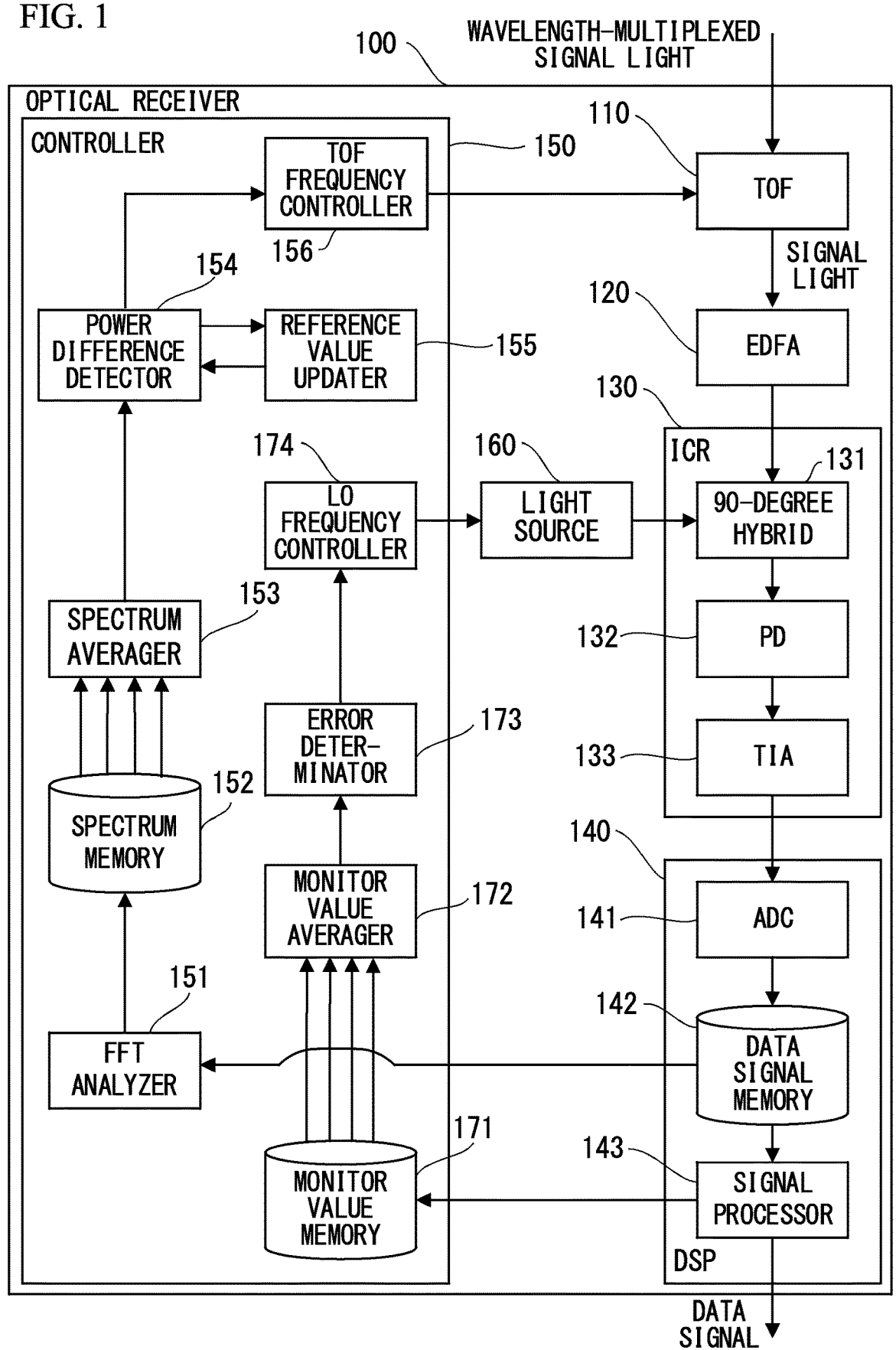
FIG. 1 is a block diagram illustrating an example of an optical receiver.

By the way, the fluctuation of the signal light can be absorbed after the generation of the data signal by controlling the gain of the amplifier such as TIA. However, when the gain is controlled and changed, the SNR (Signal to Noise Ratio) is deteriorated due to the fluctuation of the band characteristics. That is, the signal quality of the data signal output from the amplifier is deteriorated. In order to suppress the change in gain, for example, it is assumed that an optical amplifier such as an EDFA (Erbium Doped Fiber Amplifier) is provided at a front stage of the receiver to control the optical power to be constant. As a result, the dynamic range of the electric data signal input to the amplifier is reduced, and the change in gain is suppressed.

However, in the case where the optical amplifier is provided at the front stage of the receiver to receive the wavelength-multiplexed signal light, a large excitation light power is required for the optical amplifier due to the influence of adjacent light adjacent to the signal light including the target wavelength channel. Therefore, it is desirable to provide a TOF (Tunable Optical Filter) at the front stage of the optical amplifier and to input signal light of a single wavelength channel including the target wavelength channel into the optical amplifier. The TOF can select a transmission wavelength by a control voltage superimposed with a dither signal (a small amount of noise fluctuation). Since the signal light of the single wavelength channel is input to the optical amplifier by the TOF, an increase in excitation light power can be suppressed. The dither signal is detected based on the fluctuation of the optical power of the signal light output from the TOF, and the control voltage is determined.

On the other hand, when the TOF is provided at the front stage of the optical amplifier, the wavelength-multiplexed signal light is input to the TOF. When the wavelength-multiplexed signal light is input to the TOF, the fluctuation of the optical power due to the dither signal becomes small due to the influence of the adjacent light, and the detection accuracy of the dither signal decreases. In addition to the influence of the adjacent light, for example, in the case where the baud rate of the optical signal is small, the fluctuation of the optical power due to the dither signal is small, and the detection accuracy of the dither signal is reduced. In addition, the optical power of the optical signal input to the TOF may be reduced, and the influence of ASE (Amplified Spontaneous Emission) due to transmission may also reduce the variation of the optical power due to the dither signal and the detection accuracy of the dither signal may be reduced.

If the detection accuracy of the dither signal is reduced, the control voltage cannot be accurately determined, and appropriate control of the TOF may not be performed. If the TOF is not properly controlled, the frequency spectrum of the signal light may be partially cut by the TOF and the signal quality of the signal light may be degraded.

Accordingly, it is an object of one aspect to provide an optical receiver which suppresses deterioration of the signal quality of the signal light.

Hereinafter, an embodiment for carrying out the present disclosure will be described with reference to the drawings.

As illustrated in FIG. 1, the optical receiver 100 includes a TOF 110, an EDFA 120, an Intradyne Coherent Receivers (ICR) 130, a DSP (Digital Signal Processor) 140, a controller 150, and a light source 160. The TOF 110 is an example of an optical filter. The EDFA 120 is an example of an optical amplifier. The TOF 110 is provided at the front stage of the EDFA 120. The EDFA 120 is provided at the front stage of the ICR 130. Therefore, the EDFA 120 is sandwiched between the TOF 110 and the ICR 130.

Figure 2A:
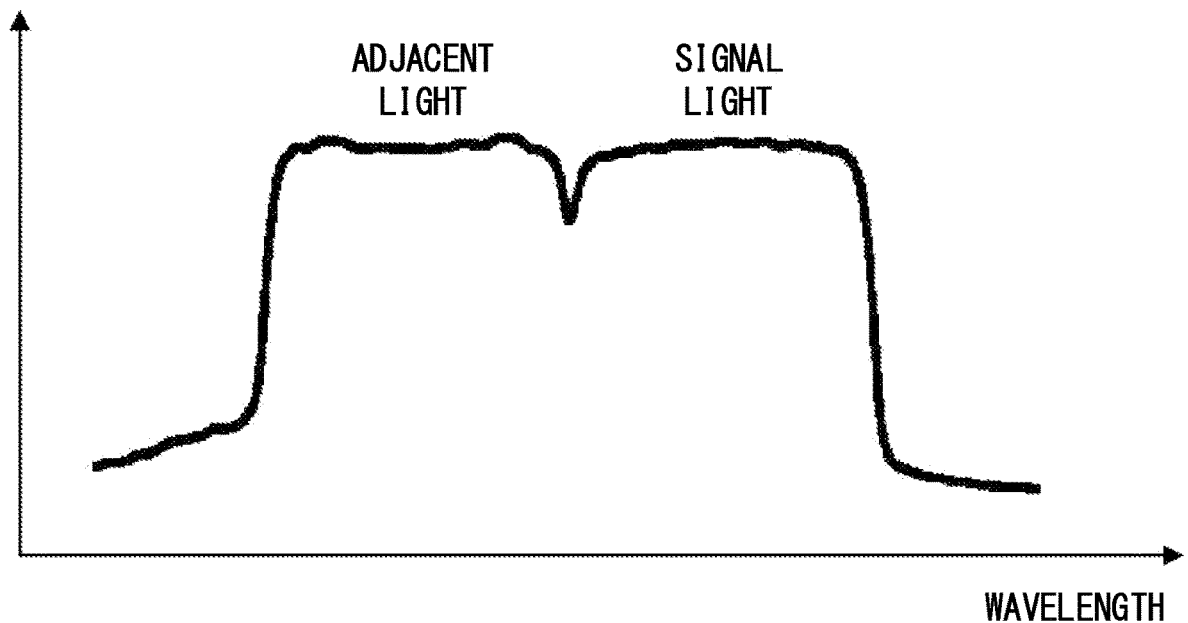
FIG. 2A is a diagram illustrating an example of a wavelength spectrum of wavelength-multiplexed signal light.
Figure 2B:
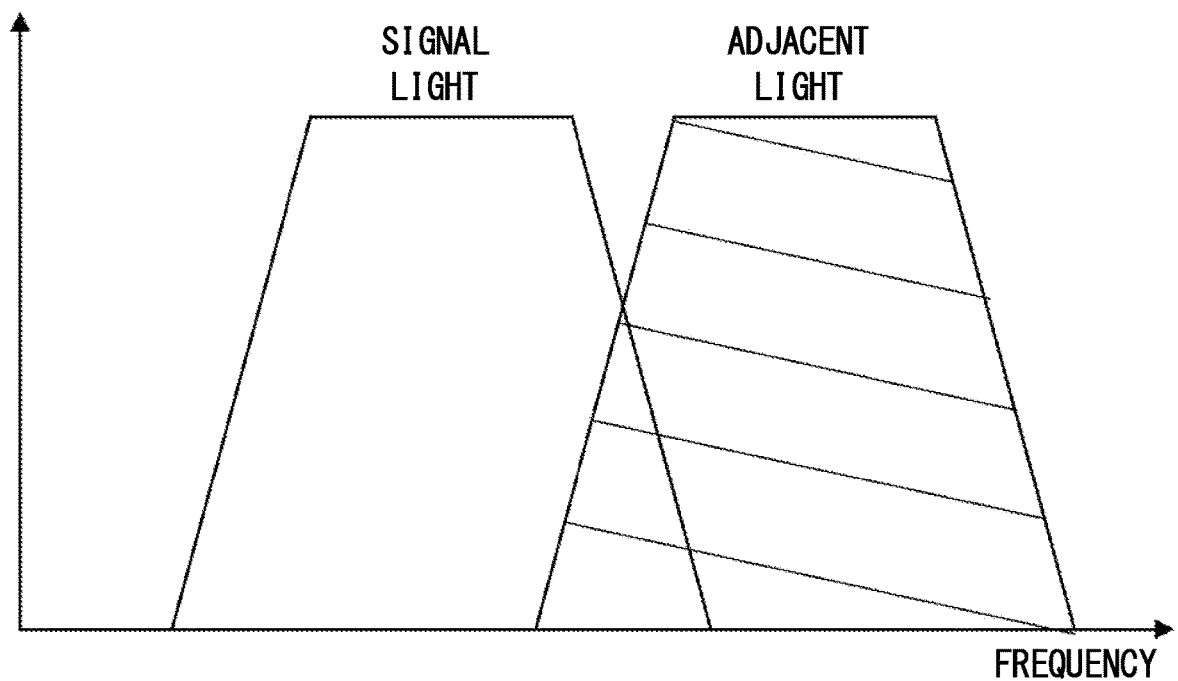
FIG. 2B is a diagram illustrating an example of a frequency spectrum of the wavelength-multiplexed signal light.

The TOF 110 sets a center frequency of a passband of a wavelength or frequency based on a control voltage output from the controller 150. Although the control voltage in this embodiment does not include a dither signal, it may include the dither signal. Wavelength-multiplexed signal light including a plurality of wavelength channels is input to the TOF 110. The wavelength channel may be referred to as the center wavelength. For example, as illustrated in FIGS. 2A and 2B, the wavelength-multiplexed signal light including signal light including a wavelength channel to be received and adjacent light including a wavelength channel adjacent to the signal light is input to the TOF 110. When the TOF 110 receives the wavelength-multiplexed signal light, it removes unnecessary adjacent light that is not a reception target and passes the signal light of the single wavelength channel that is the reception target.

The EDFA 120 amplifies the signal light passed through the TOF 110 and outputs the amplified signal light to the ICR 130. Since the signal light of the single wavelength channel passed through the TOF 110 is input to the EDFA 120, an increase in the excitation light power can be suppressed in the EDFA 120. The ICR 130 receives the signal light, converts the received signal light into an electrical data signal corresponding to the signal light, and outputs it to the DSP 140.

The ICR 130 includes a 90-degree hybrid circuit (hereafter simply described as a 90-degree hybrid) 131, a PD 132, and a TIA 133. The PD 132 is an example of a converter. The TIA 133 is an example of an amplifier. The TIA 133 is provided at a rear stage of the PD 132. The signal light received by the ICR 130 is input to the 90-degree hybrid 131. The local oscillation light output from the light source 160 is input to the 90-degree hybrid 131. The 90-degree hybrid 131 divides, interferes and delays the input signal light and the input local oscillation light by an internal optical waveguide, and outputs interference signal light to the PD 132.

The PD 132 receives the interference signal light output from the 90-degree hybrid 131, converts it into the electrical data signal by photoelectric conversion, and outputs it to the TIA 133. The TIA 133 amplifies and outputs the data signal output from the PD 132. As a result, the ICR 130 outputs the data signal. Since the EDFA 120 is provided at the front stage of the ICR 130, the optical power of the signal light can be controlled to be constant. As a result, the dynamic range of the electrical data signal input to the TIA 133 is reduced, and a change in gain can be suppressed.

When the DSP 140 receives the data signal, it converts the received data signal from an analog format to a digital format, performs various signal processes on the converted signal, and outputs the signal. The DSP 140 includes an ADC (Analog Digital Converter) 141, a data signal memory 142, and a signal processor 143. The ADC 141 converts the data signal received by the DSP 140 from the analog format to the digital format and stores the converted data signal in the data signal memory 142. As a result, the data signal memory 142 stores the data signal. When the DSP 140 periodically receives the data signals, the data signal memory 142 stores the data signals in digital format in time series.

The signal processor 143 calculates a frequency offset in the process of signal processing the data signal output from the data signal memory 142. The frequency offset is a difference between the frequency of the data signal and the frequency of the local oscillation light. The signal processor 143 outputs the frequency offset as a monitor value to the controller 150, acquires the data signal output from the data signal memory 142, performs signal processing on the data signal, and outputs the data signal to the outside of the DSP 140. As a result, the DSP 140 outputs the data signal.

The controller 150 controls the center frequency of the passband of the TOF 110 based on the data signal acquired from the data signal memory 142. Further, the controller 150 controls the center frequency of the local oscillation light output from the light source 160 based on the monitor value output from the signal processor 143. The controller 150 can be realized by a hardware circuit such as an FPGA (Field Programmable Gate Array). Instead of the FPGA, the controller 150 may be realized by a hardware circuit such as a CPU (Central processor) or an ASIC (Application Specific Integrated Circuit).

The controller 150 includes an FFT (Fast Fourier Transform) analyzer 151, a spectrum memory 152, a spectrum averager 153, a power difference detector 154, a reference value updater 155, and a TOF frequency controller 156. The FFT analyzer 151 is an example of a spectrum detector. The power difference detector 154 is an example of a difference detector. The reference value updater 155 is an example of a determinator. The TOF frequency controller 156 is an example of a frequency controller. The controller 150 includes a monitor value memory 171, a monitor value averager 172, an error determinator 173, and an LO (Local Oscillator) frequency controller 174.

Figure 3:
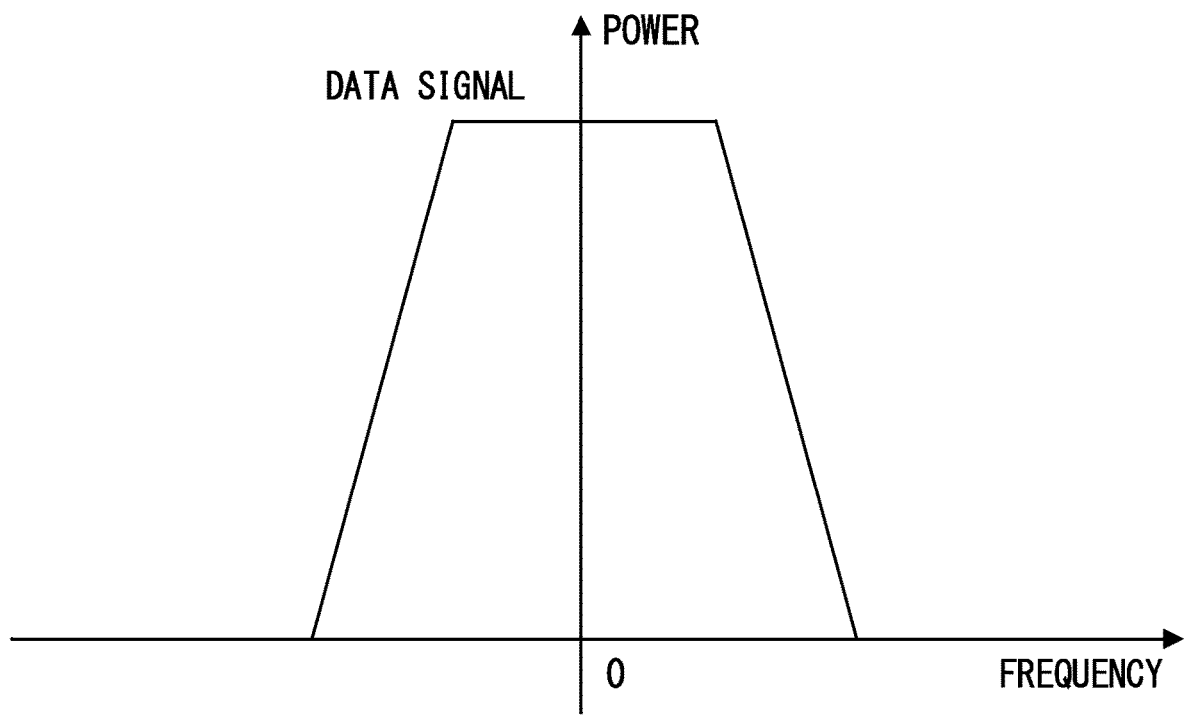
FIG. 3 is a diagram illustrating an example of a frequency spectrum of a data signal.

The FFT analyzer 151 acquires the data signal from the data signal memory 142. The FFT analyzer 151 analyzes the data signal by executing FFT, and detects a frequency spectrum which is a signal characteristic of the data signal. The FFT analyzer 151 stores the detected frequency spectrum in the spectrum memory 152. Thus, as illustrated in FIG. 3, the spectrum memory 152 stores the frequency spectrum of the data signal. Although details will be described later, the center frequency of the frequency spectrum can be controlled around 0 Hz by controlling the light source 160 to make the frequency offset close to elimination (i.e., 0). The FFT analyzer 151 periodically acquires the data signals and periodically detects and stores frequency spectra, so that the spectrum memory 152 stores a plurality of frequency spectra in time series.

The spectrum averager 153 acquires a plurality of frequency spectra from the spectrum memory 152 and averages the frequency spectra. Specifically, the spectrum averager 153 adds up the plurality of frequency spectra and divides the added frequency spectra by the number of acquired frequency spectra. As a result, variations in frequency spectrum can be suppressed. The spectrum averager 153 outputs the averaged frequency spectrum to the power difference detector 154.

Figure 4:
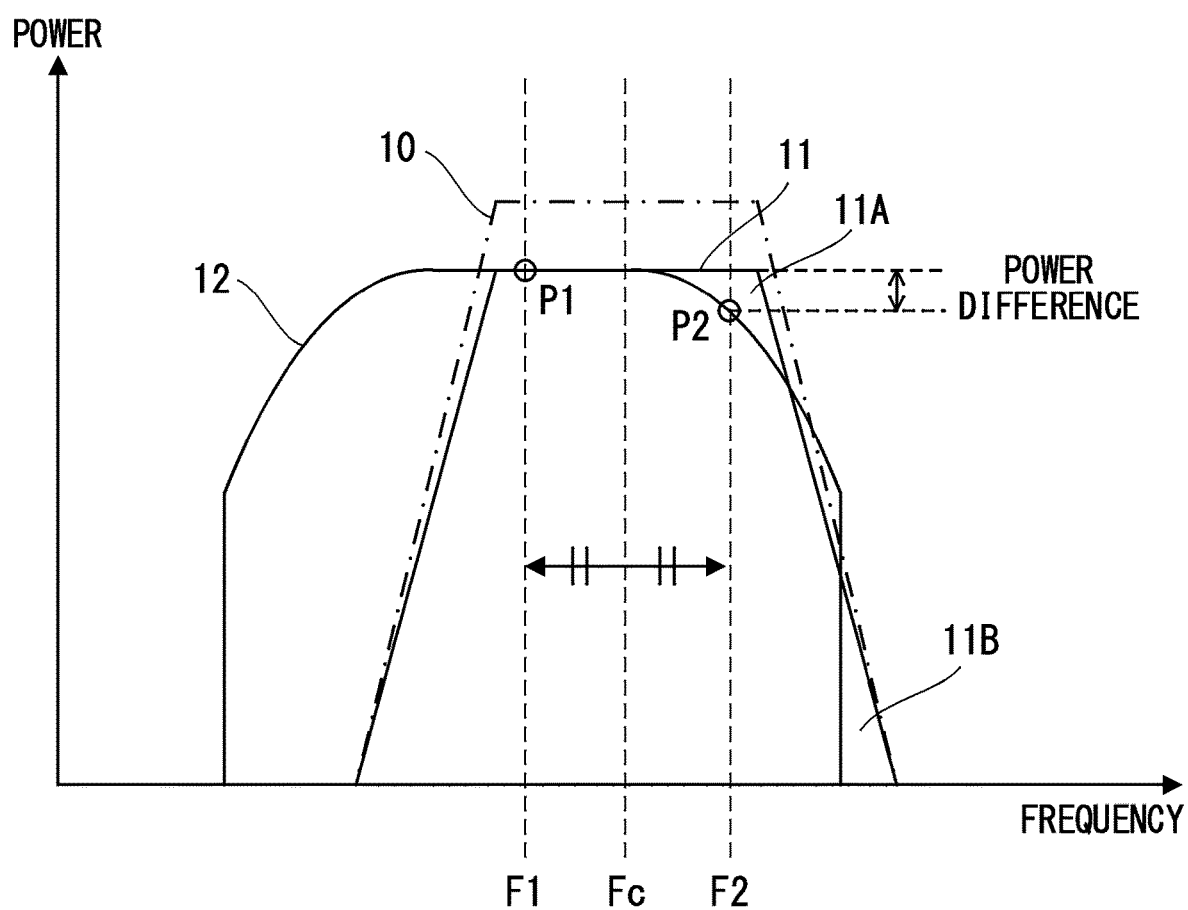
FIG. 4 is a diagram illustrating an example of a passband of a TOF before shifting.

The power difference detector 154 detects a power difference that is a difference between the powers of two frequency elements separated by a predetermined frequency from the center frequency of the frequency spectrum output from the spectrum averager 153 on a low frequency side in a negative direction and on a high frequency side in a positive direction. Specifically, as illustrated in FIG. 4, the power difference detector 154 identifies a first power P1, which is an intersection point between the passband 12 of the TOF 110 and the first frequency F1 which is separated from the center frequency Fc of a frequency spectrum 11 of the data signal belonging to the reception band 10 by a certain frequency on the low frequency side. Further, the power difference detector 154 identifies a second power P2 that is an intersection point between the second frequency F2, which is separated from the center frequency Fc by the predetermined frequency on the high frequency side, and the passband 12 of the TOF 110. As the predetermined frequency, for example, a calculation result of "transmission signal band/2× constant a (a≤1)" can be adopted.

The power difference detector 154 detects a power difference which is a difference between the identified first power P1 and the identified second power P2. When the power difference detector 154 detects the power difference, it outputs the power difference to the TOF frequency controller 156 while storing the power difference as a power difference before the frequency control of the TOF 110. The power difference before the frequency control stored in the power difference detector 154 is compared with a power difference after the frequency control of the TOF 110. The power difference detector 154 calculates a power difference change amount representing a change amount of the power difference based on the power differences before and after the frequency control. The power difference detector 154 registers the power difference change amount in the reference value updater 155.

As illustrated in FIG. 4, when the center frequency of the passband 12 of the TOF 110 deviates from the center frequency Fc of the data signal, spectral portions 11A and 11B, which are parts of the frequency spectrum 11, protrude outside the passband 12. As a result, the spectral portions 11A and 11B of the frequency spectrum 11 are cut by the TOF 110, thereby changing the shape of the frequency spectrum 11. As a result, the signal quality is degraded.

The reference value updater 155 stores a reference value "0" as an initial value. When the power difference change amount is registered from the power difference detector 154, the reference value updater 155 adds the power difference change amount for N (N is a natural number) times and determines the change between the added value and the previous added value. Although details will be described later, when there is no change between the added value and the previous added value, the reference value updater 155 identifies a cutting factor that the frequency spectrum has been cut due to the influence of the transmission line, and stores the power difference of the frequency spectrum cut by the transmission line as a new reference value.

The TOF frequency controller 156 generates the control voltage for controlling the center frequency of the passband of the TOF 110 based on the power difference output from the power difference detector 154 and outputs the control voltage to the TOF 110. Specifically, the TOF frequency controller 156 determines a shift direction of the center frequency of the passband of the TOF 110 based on the power difference so that the power difference decreases (preferably disappears), and generates and outputs the control voltage for shifting the center frequency of the passband of the TOF 110 by a unit frequency shift amount in the determined shift direction. As a result, the center frequency of the passband of the TOF 110 is shifted based on the control voltage, and the power difference is reduced or eliminated.

The monitor value memory 171 stores the monitor value output from the signal processor 143. When the monitor values are periodically output from the signal processor 143, the monitor value memory 171 stores the monitor values in time series.

The monitor value averager 172 acquires a plurality of monitor values from the monitor value memory 171 and averages the monitor values. More specifically, the monitor value averager 172 adds the plurality of monitor values, and divides the added monitor value by the number of acquired monitor values. As a result, variations in monitor values can be suppressed. The monitor value averager 172 outputs the averaged monitor value to the error determinator 173.

The error determinator 173 determines an error amount with respect to a predetermined desired frequency offset based on the monitor value output from the monitor value averager 172. For example, when the error amount is larger than a threshold error amount, the error amount is output to the LO frequency controller 174. If the error amount is smaller than the threshold error amount, the output of the error amount to the LO frequency controller 174 is stopped. The LO frequency controller 174 controls the frequency of the local oscillation light output from the light source 160 based on the error amount output from the error determinator 173. Specifically, the LO frequency controller 174 controls the frequency of the local oscillation light so that the error amount disappears. As a result, the center frequency of the frequency spectrum can be controlled around 0 Hz.

Figure 5:
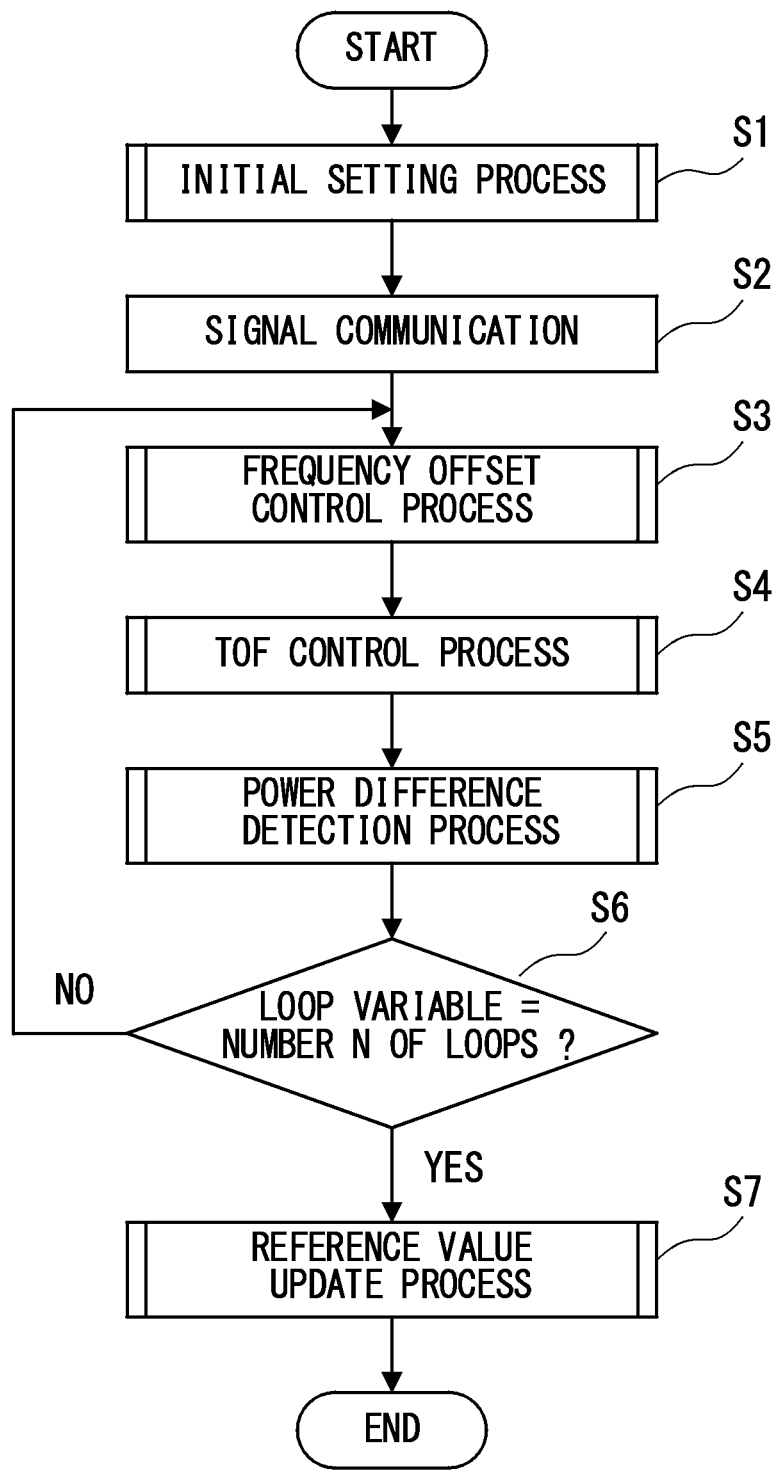
FIG. 5 is a flowchart illustrating an example of the operation of a controller.

Referring to FIG. 5, the overall operation of the controller 150 will be described. First, the controller 150 executes an initial setting process before signal communication (step S1). As will be described in detail later, the initial setting process is a process of setting various initial values to the optical receiver 100. When the initial setting process is executed, the controller 150 starts the signal communication (step S2) and executes a frequency offset control process (step S3). As will be described in detail later, the frequency offset control process is a process for controlling the frequency offset to be close to 0 by bringing the frequency of the local oscillation light close to the frequency of the signal light including the wavelength of the target channel.

When the frequency offset control process is executed, the controller 150 executes a TOF control process (step S4). As will be described in detail later, the TOF control process is a process of shifting the center frequency of the passband of the TOF 110 to the high frequency side (i.e., a short wavelength side) or the low frequency side (i.e., a long wavelength side) based on the control voltage. When the TOF control process is executed, the controller 150 executes a power difference detection process (step S5). As will be described in detail later, the power difference detection process is a process of detecting the power difference change amount between the power difference before shifting the frequency of the TOF 110 and the power difference after shifting it. When the power difference detection process is executed, the controller 150 determines whether or not the loop variable, which is the number of times steps S3 to S5 are repeated, reaches the number N of loops set as an initial value (step S6). If the loop variable has not reached the number N of loops (step S6: NO), the controller 150 repeats the processes of steps S3 to S5 and advances the loop variable.

When the loop variable reaches the number N of loops (step S6: YES), the controller 150 executes a reference value update process (step S7). As will be described in detail later, the reference value updating process is a process of updating a reference value to be compared with the power difference according to the power difference change amount. When the reference value updating process is executed, the controller 150 ends the process.

Figure 6:
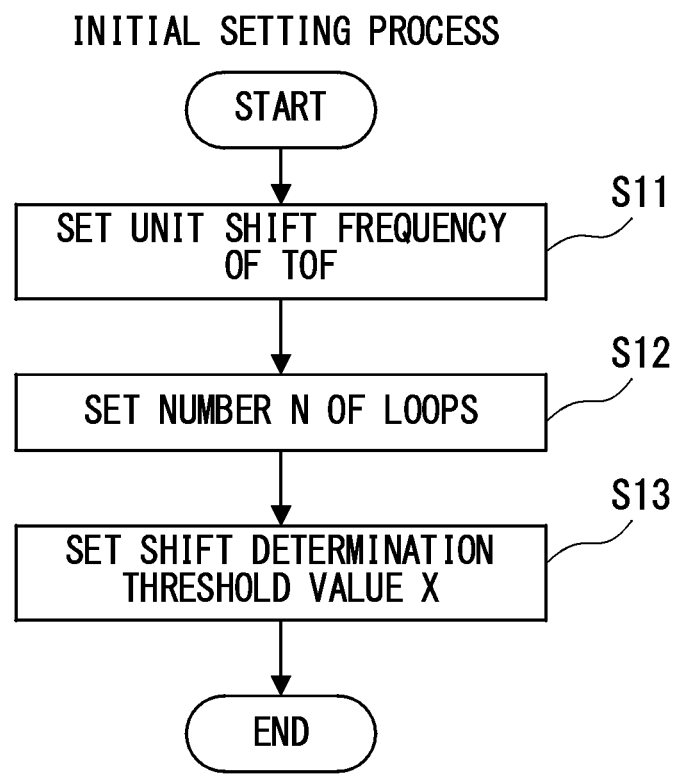
FIG. 6 is a flowchart illustrating an example of an initial setting process.

The initial setting process will be described with reference to FIG. 6. When the controller 150 starts the initial setting process, first, the TOF frequency controller 156 sets a unit shift frequency of the TOF 110 (step S11). The unit shift frequency is an amount of frequency shift per one time. For example, when the unit shift frequency is transmitted from an operation terminal such as a PC (Personal Computer) or a tablet terminal to the optical receiver 100, the TOF frequency controller 156 sets the unit shift frequency to itself.

When the unit shift frequency is set, the power difference detector 154 sets the number N of loops (step S12). The number of loops represents an upper limit of the number of frequency shifts of the TOF. When the number N of loops is transmitted from the operation terminal to the optical receiver 100, the power difference detector 154 sets the number N of loops to itself. When the number N of loops is set, the TOF frequency controller 156 sets a shift determination threshold value X (step S13). The shift determination threshold value X is a threshold value for comparing the reference value and the power difference to determine whether (1) the center frequency of the passband of the TOF 110 is shifted to the high frequency side, (2) the center frequency of the passband of the TOF 110 is maintained, or (3) the center frequency of the passband of the TOF 110 is shifted to the low frequency side. When the shift determination threshold value X is transmitted from the operation terminal to the optical receiver 100, the TOF frequency controller 156 sets the shift determination threshold value X to itself. When the shift determination threshold value X is set, the controller 150 ends the initial setting process.

Figure 7:
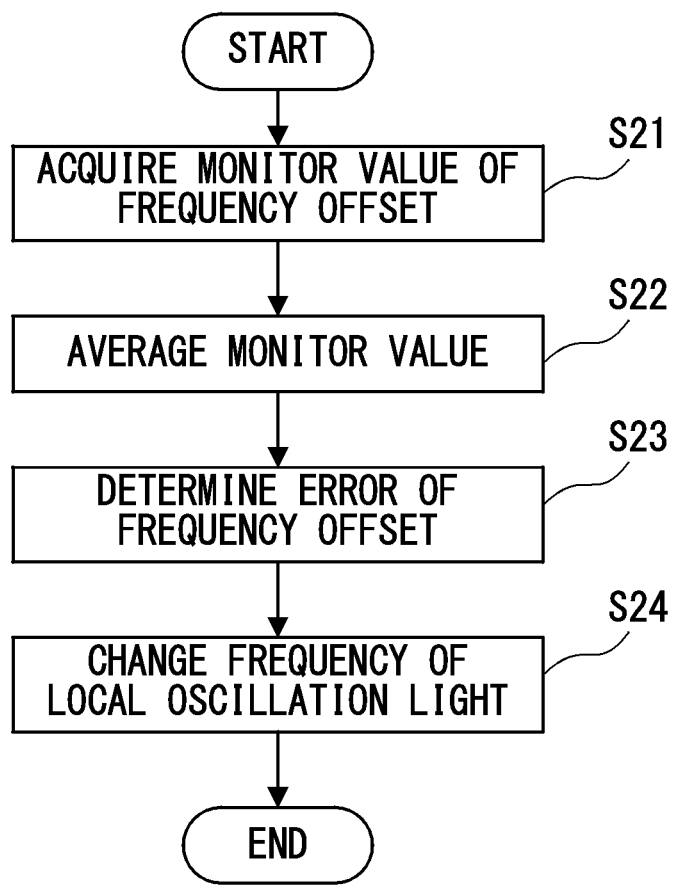
FIG. 7 is a flowchart illustrating an example of a frequency offset control process.

The frequency offset process will be described with reference to FIG. 7. When the controller 150 starts the frequency offset process, first, the monitor value averager 172 acquires the monitor value of the frequency offset from the monitor value memory 171 (step S21) and averages the monitor value (step S22). After averaging the monitor values, the error determinator 173 determines the error amount between the monitor value and the predetermined desired frequency offset (step S23). If the error amount is larger than the threshold error amount, the LO frequency controller 174 changes the frequency of the local oscillation light (step S24) so as to bring it closer to the frequency of the signal light including the wavelength of the target channel. As a result, the center frequency of the frequency spectrum can be controlled around 0 Hz. When the frequency of the local oscillation light is changed, the controller 150 ends the frequency offset process.

Figure 8:
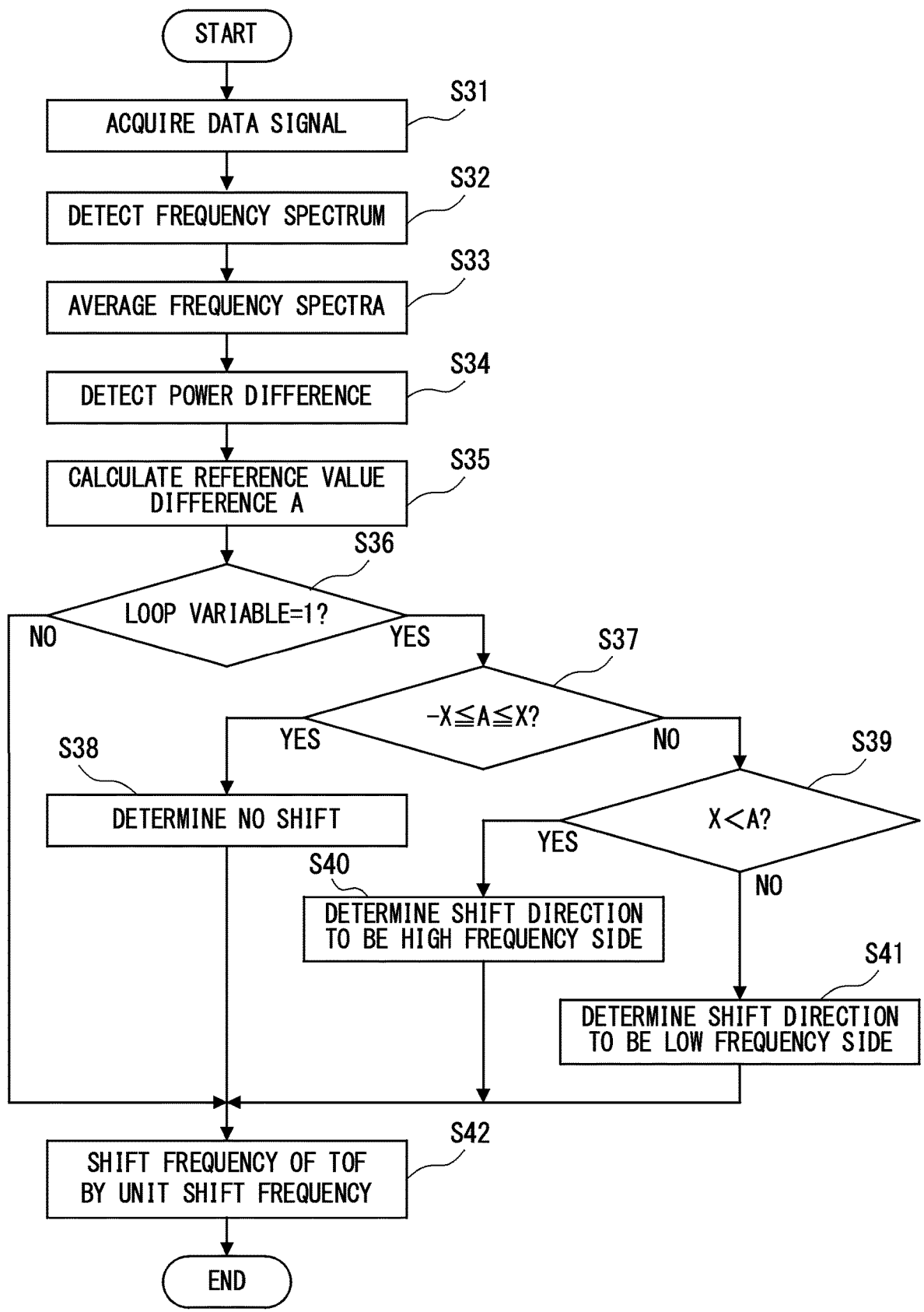
FIG. 8 is a flowchart illustrating an example of a TOF control process.
Figure 9:
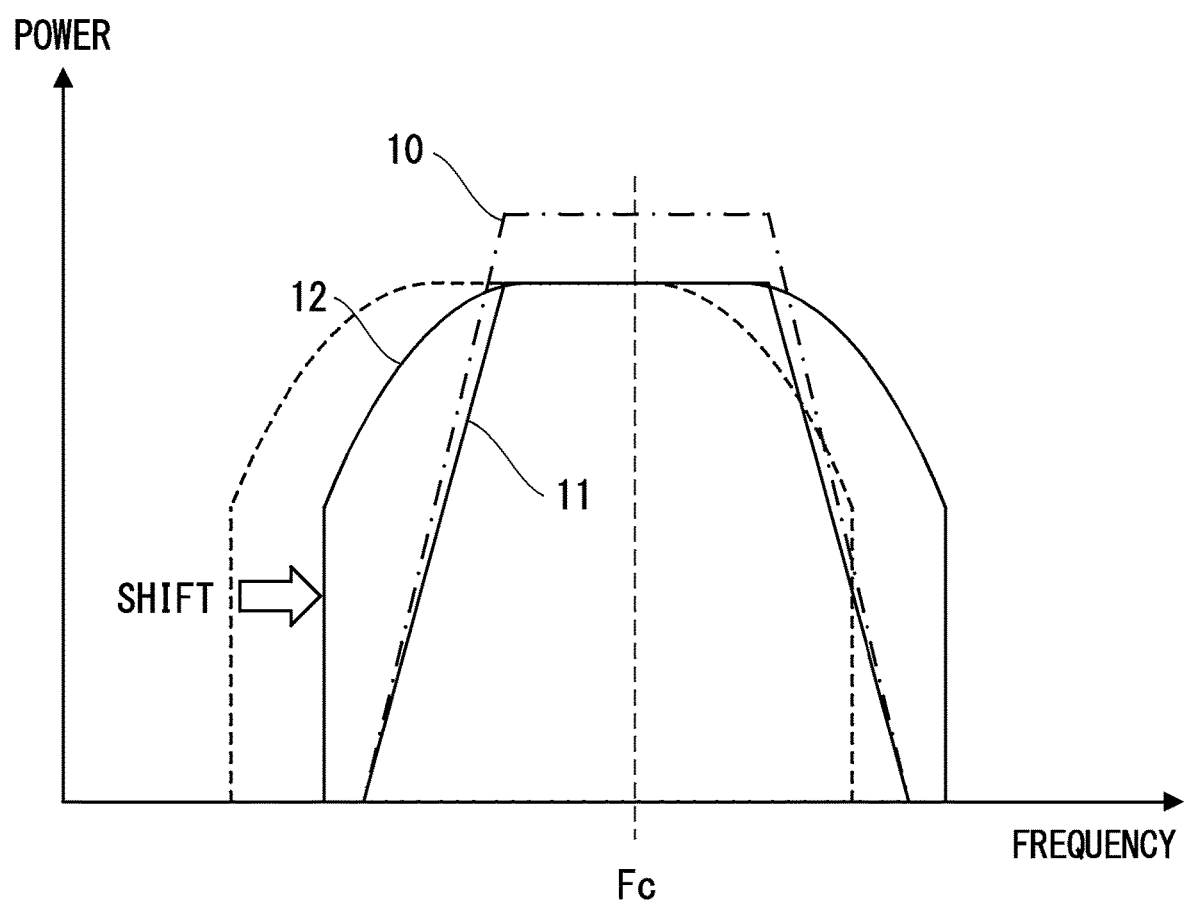
FIG. 9 is a diagram illustrating an example of the passband of the TOF after shifting.

The TOF control process will be described with reference to FIGS. 8 and 9. When the controller 150 starts the frequency offset process, as illustrated in FIG. 8, first, the FFT analyzer 151 acquires the data signal from the data signal memory 142 (step S31) and detects the frequency spectrum (step S32). The FFT analyzer 151 stores the detected frequency spectrum in the spectrum memory 152. The spectrum averager 153 acquires the frequency spectra from the spectrum memory 152 and averages the frequency spectra (step S33). After the frequency spectra are averaged, the power difference detector 154 detects the power difference (step S34). Specifically, the power difference detector 154 identifies the first power P1 and the second power P2 described above, and detects the power difference that is the difference between the identified first power P1 and the identified second power P2 (see FIG. 4).

When the power difference is detected, the power difference detector 154 calculates a reference value difference A (step S35). The reference value difference A is a difference between the power difference and the reference value. When the power difference is detected, the power difference detector 154 acquires the reference value from the reference value updater 155 and calculates the reference value difference A based on the detected power difference and the acquired reference value. After calculating the reference value difference A, the TOF frequency controller 156 determines whether the loop variable is 1 (step S36). That is, the TOF frequency controller 156 determines whether the number of times of execution of the processes of steps S3 to S5 described above is the first time.

If the loop variable is 1 (step S36: YES), the TOF frequency controller 156 determines whether the reference value difference A is equal to or more than a negative shift determination threshold value X and equal to or less than a positive shift determination threshold value X (step S37). If the reference value difference A is equal to or more than the negative shift determination threshold value X and equal to or less than the positive shift determination threshold value X (step S37: YES), the TOF frequency controller 156 determines no shift to maintain the frequency of the TOF 110 (step S38). In other words, if the reference value difference A, which is the difference between the power difference and the reference value, is equal to or less than an absolute value of the shift determination threshold value X, the TOF frequency controller 156 maintains the center frequency of the passband of the TOF 110.

When the reference value difference A is not equal to or more than the negative shift determination threshold value X and not equal to or less than the positive shift determination threshold value X (step S37: NO), the TOF frequency controller 156 determines whether the reference value difference A is more than the positive shift determination threshold value X (step S39). When the reference value difference A is more than the positive shift determination threshold value X (step S39: YES), the TOF frequency controller 156 determines the shift direction of the TOF 110 to be the high frequency side (i.e., the short wavelength side) (step S40). Conversely, when the reference value difference A is less than the negative shift determination threshold value X (step S39: NO), the TOF frequency controller 156 determines the shift direction of the TOF 110 to be the low frequency side (i.e., the long wavelength side) (step S41). As described above, the TOF frequency controller 156 determines the control direction of the center frequency of the passband of the TOF 110 and adjusts the center frequency of the passband 12 of the TOF 110 based on the comparison result between the reference value difference A based on the power difference, and the shift determination threshold value X.

When the process in steps S38, S40, and S41 ends, or when the loop variable is not 1 (step S36; NO), the TOF frequency controller 156 shifts the frequency of the TOF 110 by the unit shift frequency based on the determined shift direction (step S42). For example, when the reference value difference A is more than the positive shift determination threshold value X, the center frequency of the passband 12 of the TOF 110 shifts to the high frequency side as illustrated in FIG. 9. This reduces or eliminates the power difference. When the power difference is eliminated, the center frequency Fc of the frequency spectrum 11 coincides with the center frequency of the passband 12 of the TOF 110, and cutting of the frequency spectrum 11 can be avoided. As a result, deterioration of signal quality can be suppressed. When the number of repetitions of steps S3 to S5 is two or more such as the loop variable=2, the TOF frequency controller 156 shifts the center frequency of the passband 12 of the TOF 110 in accordance with the shift direction determined at the first time until the N-th time. When the center frequency of the passband 12 of the TOF 110 is shifted, the controller 150 ends the TOF control process.

Figure 10:
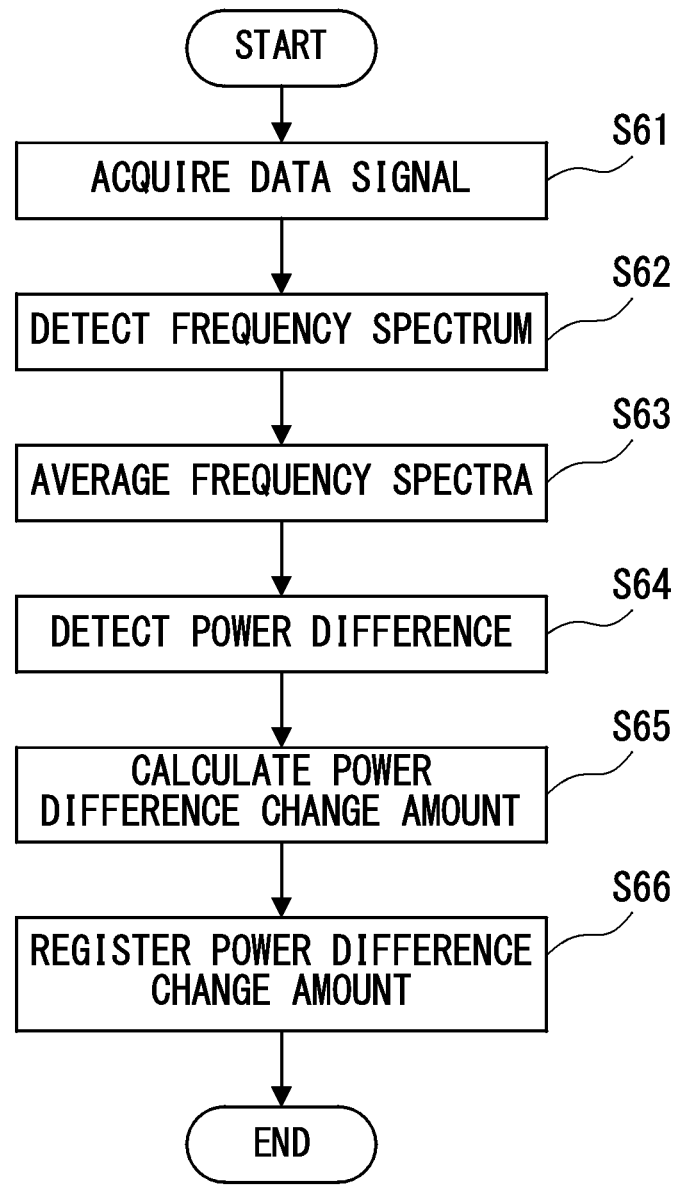
FIG. 10 is a flowchart illustrating an example of a power difference detection process.

The power difference detection process will be described with reference to FIG. 10. When the controller 150 starts the power difference detection process, the FFT analyzer 151 acquires the data signal from the data signal memory 142 (step S61) and detects the frequency spectrum (step S62). The FFT analyzer 151 stores the detected frequency spectrum in the spectrum memory 152. The spectrum averager 153 acquires the frequency spectra from the spectrum memory 152 and averages the frequency spectra (step S63). After the frequency spectra are averaged, the power difference detector 154 detects the power difference (step S64).

When the power difference is detected, the power difference detector 154 calculates the power difference change amount (step S65). Specifically, the power difference detector 154 calculates the power difference change amount between the power difference before shifting the frequency of the TOF 110 and the power difference after shifting the frequency. When the power difference change amount of the power difference is calculated, the power difference detector 154 registers the power difference change amount in the reference value updater 155 (step S66). When the power difference change amount is registered, the controller 150 ends the power difference detection process.

Figure 11:
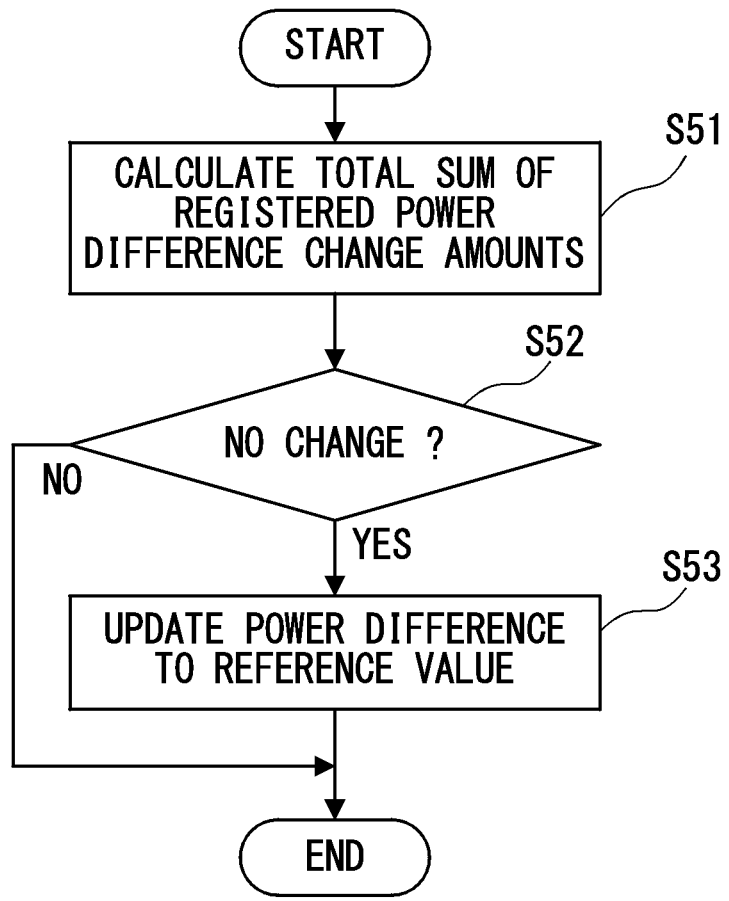
FIG. 11 is a flowchart illustrating an example of a reference value update process.

The reference value update process will be described with reference to FIGS. 11 and 12. First, when the controller 150 starts the reference value update process, as illustrated in FIG. 11, the reference value updater 155 calculates the total sum of the registered power difference change amounts from the power difference detector 154 (step S51). For example, if the loop variable is 1, the reference value updater 155 calculates the total sum of the power difference change amounts for one time. If the loop variable is 2, the reference value updater 155 calculates the total sum of the power difference change amounts for two times. If the frequency spectrum 11 has a trapezoid shape (see FIG. 4), as the frequency of the TOF 110 shifts in the same direction, the power difference change amount decreases and the total sum thereof increases. In other words, the power difference change amount changes. In such a case, the reference value updater 155 identifies the cutting factor that the frequency spectrum has been cut due to the influence of the TOF 110.

Figure 12A:
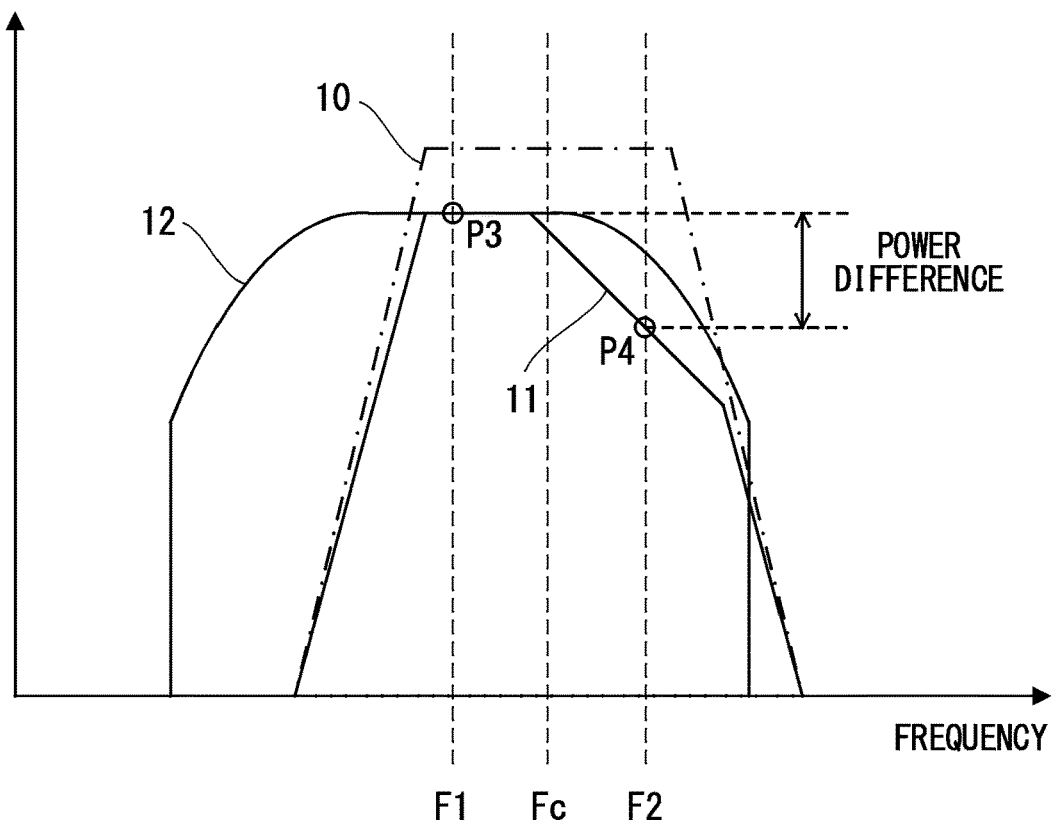
FIG. 12A is a diagram illustrating another example of the passband of the TOF before shifting.

On the other hand, as illustrated in FIG. 12A, there is a case where the frequency spectrum 11 is cut due to the influence of the transmission line and is deformed from a trapezoid to a left-right asymmetric quadrangle. In such a case, even if the passband 12 of the TOF 110 shifts in the same direction, the power difference change amount of the power difference detected by the third power P3 and the fourth power P4 does not change, so that the total sum thereof does not change. Thus, the shifts may not converge. In such a case, the reference value updater 155 identifies a cutting factor that the frequency spectrum has been cut due to the influence of the transmission line of the wavelength-multiplexed signal light. Therefore, when the total sum of the power difference change amounts is calculated, the reference value updater 155 determines whether the power difference change amount changes (step S52). That is, the reference value updater 155 compares a first shape of the frequency spectrum at the current center frequency of the TOF 110 with a second shape of the frequency spectrum at the existing center frequency of the TOF 110, and determines whether there is a difference between the first shape and the second shape. The existing center frequency may be a past center frequency or may be a registered center frequency registered in, for example, a memory.

Figure 12B:
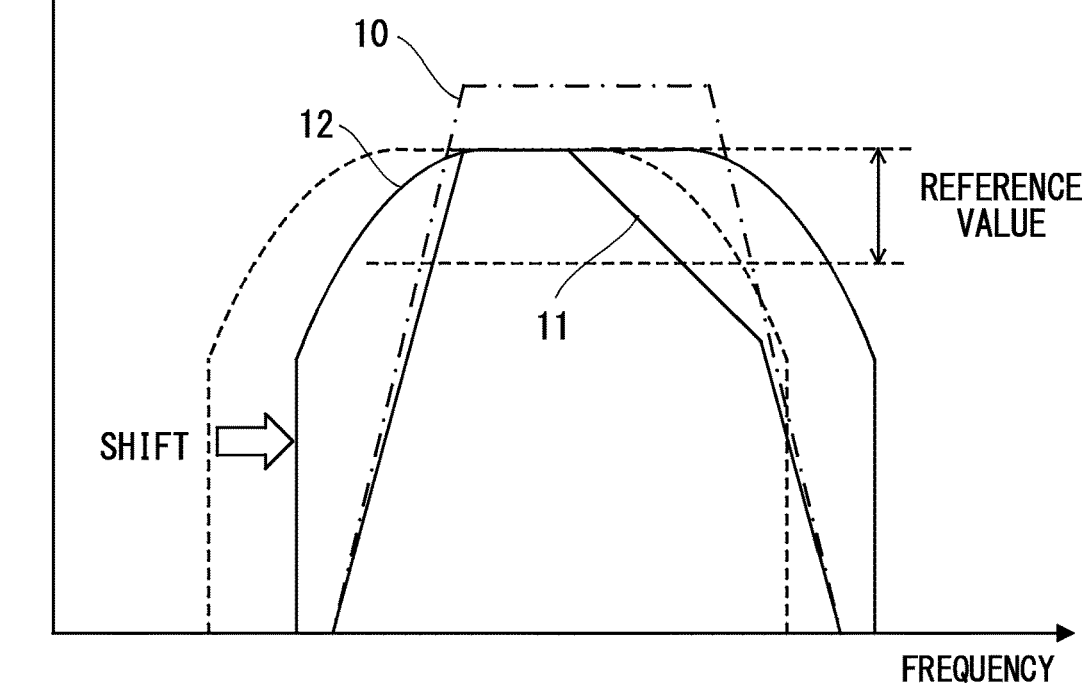
FIG. 12B is a diagram illustrating another example of the passband of the TOF after shifting.

If the power difference change amount does not change (step S52: YES), that is, if there is no difference between the first shape and the second shape as the comparison result, the reference value updater 155 can determine that the frequency spectrum 11 is cut due to the transmission line. In this case, the reference value updater 155 updates the power difference to the reference value (step S53). As a result, even if the shift of the passband 12 of the TOF 110 is continued as illustrated in FIG. 12B, since the reference value difference A becomes 0 in the subsequent process, the shift of the passband 12 of the TOF 110 can be converged. When the power difference change amount changes (step S52: NO), that is, when there is the difference between the first shape and the second shape as the comparison result, it can be determined that the frequency spectrum 11 is cut due to the TOF 110. In this case, the process of the subsequent step S53 is skipped. As described above, the reference value updater 155 determines whether to further control the center frequency of the TOF 110 based on the comparison result between the first shape and the second shape. When the power difference is updated to the reference value or the process of step S53 is skipped, the controller 150 ends the reference value update process.

As described above, in the optical receiver 100 according to the present embodiment, the ICR 130 includes the TIA 133. The EDFA 120 is provided at the front stage of the ICR 130, and the TOF 110 is provided at the front stage of the EDFA 120. In such an optical receiver 100, even if the TOF 110 is not controlled by the control voltage on which the dither signal is superimposed, it is possible to suppress deterioration in signal quality of the signal light due to the TOF 110.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical receiver comprising:
    an optical filter that passes signal light to be received from wavelength-multiplexed signal light;
    a light source that outputs local oscillation light;
    a 90-degree hybrid circuit that causes the local oscillation light output from the light source to interfere with the signal light passed through the optical filter to output interference signal light;
    a converter that converts the interference signal light into an electrical data signal;
    a spectrum detector that detects a frequency spectrum of the electrical data signal based on the electrical data signal; and
    a controller that controls a center frequency of a passband of the optical filter based on a shape of the frequency spectrum.

2. The optical receiver as claimed in claim 1, wherein the controller includes a determinator that compares the shape of the frequency spectrum at a current center frequency of the optical filter with the shape of the frequency spectrum at an existing center frequency of the optical filter, and determines whether to further control the center frequency of the optical filter based on a comparison result.

3. The optical receiver as claimed in claim 1, wherein the controller includes a difference detector that detects a difference between powers of respective frequency elements separated by a predetermined frequency in a positive direction and a negative direction from the center frequency of the electrical data signal based on the shape of the frequency spectrum, and a frequency controller that controls the center frequency of the passband of the optical filter so as to reduce the difference.

4. The optical receiver as claimed in claim 3, wherein the controller determines a control direction of the center frequency of the passband of the optical filter based on a comparison result between the difference and a threshold value.

5. The optical receiver as claimed in claim 4, wherein the controller maintains the center frequency of the passband when the difference is equal to or less than the threshold value.

6. The optical receiver as claimed in claim 1, wherein an optical amplifier that amplifies the signal light passed through the optical filter is provided on a front stage of the 90-degree hybrid circuit, and an amplifier that amplifies the electrical data signal is provided on a rear stage of the converter.

7. The optical receiver as claimed in claim 1, wherein the controller acquires a frequency offset generated between the signal light and the local oscillation light, and causes the light source to output the local oscillation light at an output frequency that makes the center frequency of a signal characteristic of the electrical data signal zero based on the acquired frequency offset.

8. The optical receiver as claimed in claim 3, wherein the predetermined frequency is a frequency obtained by multiplying a half of a transmission signal band of the signal light by a constant of 1 or less.

9. The optical receiver as claimed in claim 3, wherein the controller identifies a cutting factor of a signal characteristic of the electrical data signal based on whether or not the difference changes.

10. The optical receiver as claimed in claim 9, wherein when the difference does not change, the controller identifies the cutting factor as a transmission line, stores the difference, and adjusts the optical filter in such a direction that the stored difference disappears.

11. The optical receiver as claimed in claim 9, wherein when the difference changes, the controller identifies the cutting factor as the optical filter and adjusts the optical filter in such a direction that the difference disappears.

* * * * *